J. T. JONES.
Feeding Apparatus for Nail-Machines.
No. 219,483. Patented Sept. 9, 1879.
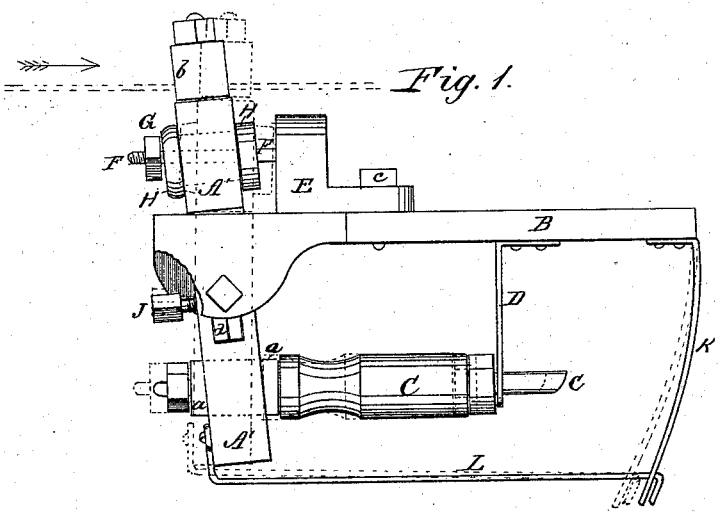
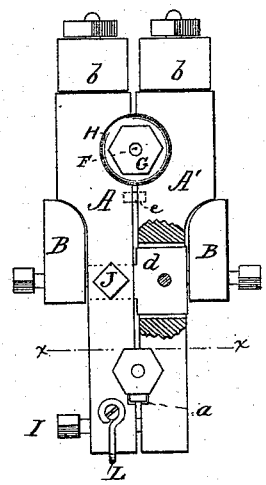
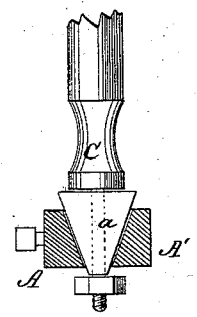
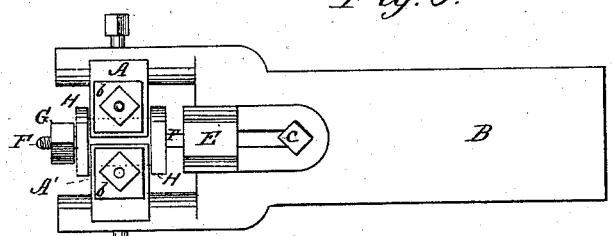
WITNESSES:
W. W. Hollingsworth
Amos W. Hart
INVENTOR:
John T. Jones
BY
ATTORNEYS.

UNITED STATES PATENT OFFICE.

JOHN T. JONES, OF CHATTANOOGA, TENNESSEE.

IMPROVEMENT IN FEEDING APPARATUS FOR NAIL-MACHINES.

Specification forming part of Letters Patent No. 219,183, dated September 9, 1879; application filed June 4, 1879.

*To all whom it may concern:*

Be it known that I, JOHN T. JONES, of Chattanooga, in the county of Hamilton and State of Tennessee, have invented a new and Improved Automatic Feeding Apparatus for Nail-Machines; and I do hereby declare that the following is a full, clear, and exact description of the same.

My invention is an improvement in the class of nail-plate feeders (such as illustrated in patents to B. F. Rice) in which pivoted vibrating forks or jaws are employed to gripe and feed the nipper-rod, in the forward end of which is secured the nail-plate.

The objects of my invention are, first, to insure a definite vibration of the feeding devices, so that the nail plate or rod shall be fed a uniform distance, thereby preventing making the nails too large; second, to adjust the throw or vibration of the forks, and thereby regulate the feed as required for nails of different sizes, all as hereinafter described.

In the accompanying drawings, forming part of this specification, Figure 1 is a side view of my improved feeder. Fig. 2 is a front elevation or end view. Fig. 3 is a plan view. Fig. 4 is a detail horizontal section on line $x$ $x$ of Fig. 2. Fig. 5 is a plan view of one of the jaws detached.

The forks A A' are pivoted vertically in the bifurcated end of the horizontal arm B, whose attachment to the nail-cutting machine it is unnecessary to describe.

C is the push-rod, which has a wedge-shaped end, $a$, for the purpose of forcing the lower ends of the forks apart laterally to cause their jaws $b$ to gripe the nipper-rod. Said wedge-shaped end $a$ enters a cavity of like shape, which is formed by cutting away the inner sides of the forks A A' at opposite points.

The other end of the push-rod is supported by a spring, D, which serves also to keep the wedge $a$ in proper position or relation to the forks.

E is an abutment, which arrests the forward movement of the forks A A', when vibrated by the action of the push-rod C, as hereinafter described. Said abutment is slotted to receive a clamp-screw, $c$, which secures it adjustably to the arm B.

A rod, F, extends forward from the abutment and passes between the forks A A'. A nut, G, is applied to its outer end, and a washer or spool, H, is interposed between the forks and abutment, and between the forks and nut. The nut G limits the throw or vibration of the forks backward as the abutment E limits it in the opposite direction.

I may in some cases dispense with the spool H; or, by using spools having flanges of different thicknesses, I may make the abutment E fixed instead of adjustable, since the difference in size of the spools will effect the same result—namely, vary or determine the forward movement of the forks.

I is a set-screw, whose office is to adjust the jaws $b$ or gage the distance between them, so that they will properly gripe nail-rods of different sizes or thickness. By screwing up said screw the jaws $b$ are caused to close upon or gripe the rod.

The set-screw J is used for setting the fork A any distance required from the fork A'. The same pivots the fork A on the connecting or cross piece $d$.

The spring for retracting the forks of a nail-feeder is usually attached to the push-up rod; but I attach such spring K to the arm B. Thus arranged the spring controls the forks more perfectly. It throws the forks back against the nut G more positively, so that the rod is griped at the required place, and the nails produced are of perfectly uniform size; whereas, when the spring is attached to the push-up rod, swinging loose, the forks tend to rebound when thrown against the nut, so that the nipper-rod is not griped at the proper place, thus causing the nail-plate to be fed irregularly.

When the push-rod C strikes the fixed portion of the machine, it has a twofold effect on the forks A A'—namely, it simultaneously throws their lower ends backward and spreads them apart, and also throws their upper ends forward and closes their jaws $b$ upon the nipper-rod. Thus the latter is griped and fed forward; and since such movement is arrested by the abutment E, the rod is always fed a uniform distance, so that over-feeding and consequent making of the nails too large are avoided.

So soon as the push-rod C is relieved of pressure the spring K and its rod L, attached to fork A, retract the forks to the limit allowed by nut G. Simultaneously with such movement, the jaws $b$ open by the action of the spring $e$, placed between the upper ends of the forks, and they are then in position to again gripe the nipper-rod and move it forward, as before.

The jaws $b$ are rectangular blocks, secured to the heads of the forks by screw-bolts, which pass through vertical holes. The latter are located eccentrically, or nearer one side of the blocks than the other, as shown in Fig. 5, which adapts the blocks for griping nail-rods of different thicknesses, since, by adjusting them on their bolts, the space between them may be obviously made greater or less.

The flat sides of the jaws $b$ constitute their griping-surfaces, and by loosening the nuts of the bolts which secure the jaws the latter will turn on the bolts, and thus adjust their faces to the sides of the rod with which they come in contact. In other words, the jaws become self-adjusting when loose on their fastening-bolts.

I do not claim, broadly, operating pivoted gripers or jaws by means of a wedge-shaped piece inserted between their free ends.

What I claim is—

1. In a nail-rod feeder, the combination, with the vertical forks and the horizontal arm B, to which they are pivoted, of the push-rod C, having its forward end wedge-shaped, to adapt it to enter a corresponding recess formed in adjacent sides of the forks, all as shown and described, whereby the push-rod causes the forks to swing on their pivot and their jaws to close on the nail-rod simultaneously, as set forth.

2. In a nail-rod feeder, the combination of the push-rod, having the wedge-shaped end, with the pivoted forks, having clamping-jaws, and the adjustable abutment, which limits the forward movement of the forks, as shown and described.

3. In a nail-rod feeder, the combination of the spring-support D with the push-rod, having the wedge-shaped end, and the pivoted forks, as shown and described.

JOHN T. JONES.

Witnesses:
  J. J. WILLARD,
  F. J. STONE.